(12) United States Patent  (10) Patent No.: US 6,674,578 B2
Sugiyama et al.  (45) Date of Patent: Jan. 6, 2004

(54) DISPLAY DEVICE FOR MOTOR VEHICLE (75) Inventors: Tetsuya Sugiyama, Shizuoka (JP);
Yoshiyuki Furuya, Shizuoka (JP);
Takeyuki Amari, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 14 days.

(21) Appl. No.: 10/156,658

(22) Filed: May 29, 2002

(65) Prior Publication Data

US 2002/0183921 A1 Dec. 5, 2002

(30) Foreign Application Priority Data

May 31, 2001 (JP) ...................................... 2001-164894

(51) Int. Cl.[7] .......................... G02B 27/14; G09G 5/00; G02F 1/1335
(52) U.S. Cl. .............................. 359/631; 345/9; 349/11; 359/630
(58) Field of Search ................................ 345/9; 349/11; 359/630, 631, 632

(56) References Cited

U.S. PATENT DOCUMENTS

| 5,398,134 | A | | 3/1995 | Ikegaya ....................... 359/630 |
| 5,422,812 | A | * | 6/1995 | Knoll et al. ................. 701/209 |
| 6,100,943 | A | * | 8/2000 | Koide et al. .................. 349/11 |
| 2002/0097196 | A1 | * | 7/2002 | Furuya et al. ................... 345/7 |
| 2002/0183921 | A1 | * | 12/2002 | Sugiyama et al. .......... 701/200 |

FOREIGN PATENT DOCUMENTS

| JP | 64-33435 | | 3/1989 |
| JP | 64-37735 | | 3/1989 |
| JP | 11-5457 | | 1/1999 |
| JP | 2000-198372 | | 7/2000 |
| JP | 2002-356118 A | * | 12/2002 ........... B60K/35/00 |

OTHER PUBLICATIONS

Copy of Great Britain Patent Office Communication including Great Britain Search Report for Great Britain Patent Application No. 0212271 dated Aug. 5, 2002.

* cited by examiner

*Primary Examiner*—David N. Spector
(74) *Attorney, Agent, or Firm*—Armstrong, Kratz, Quintos, Hanson & Brooks, LLP (57) ABSTRACT

A display device for a motor vehicle includes an indicator 3 for providing a displayed image, arranged internally in the vehicle; a combiner 5 for reflecting image light of the displayed image toward an eye point I of a driver of the vehicle, a virtual image S of the displayed image which can be visually recognized from the eye point being displayed on the combiner 5; and meter units 9, 9 for displaying a status of the vehicle as a real image, the meter units being located between the combiner and the eye point at a position outside an optical path of the image light of the displayed image. The combiner 5 has a contour which can be visually recognized from the eye point and nearly surrounds the virtual image and a real image of the meter units 9, 9. In such a configuration, a display with a sense of unity between a real image and a virtual image can be realized while avoiding an increase of a dashboard in size and complication thereof in structure.

6 Claims, 4 Drawing Sheets

DISPLAY DEVICE FOR MOTOR VEHICLE

BACKGROUND OF THE INVENTION

1. Field of the Invention

This invention relates to a display device for a motor vehicle which permits a displayed image of a light emitting source as a virtual image to be visually recognized on a combiner arranged in front of an eye point of a driver.

2. Description of the Related Art

In some cases, the motor vehicle adopts a virtual-image type display device as disclosed in J-UM-64-33435 and J-UM-64-37735. The virtual-image type display device includes a virtual-image display type combination meter which permits a real image of a meter within a dashboard and a virtual image of another meter to be visually recognized as a single meter unit using a semitransparent panel such as a half mirror fit in a front opening of the dashboard, and a head-up display which causes a virtual image of the displayed image by a light-emitting indicator within a dashboard to be displayed on a combiner or front glass arranged above the dashboard and to be visually recognized in superposition on the front scene of the vehicle beyond the combiner or front glass.

The virtual-image display type combination meter is required to limit the brightness outside the semitransparent panel to a certain degree so that the real image of the meter within the dashboard can be visually recognized through the semitransparent panel. For this purpose, a hood for preventing external light from being projected onto a semitransparent panel must be protruded from the upper edge of the dashboard. Correspondingly, the dashboard is inevitably increased in size and complicated in structure.

On the other hand, the head-up display premises that the combiner or front glass on which external light is projected is used as a screen for displaying the virtual image so that the light emitting source emits the displayed image with a large quantity of light. The head-up display, therefore, does not require a measure for interrupting the external light unlike the virtual-image display type combination meter.

However, the head-up display intends to permit various kinds of information of a vehicle to be visually recognized without moving one's eyes directed forward to an existing combination meter. Therefore, the virtual image of the displayed image by the light emitting indicator is displayed at a position apart from the combination meter. Thus, unlike the virtual image type combination meter, the head-up display cannot permit a real image of a meter and a virtual image of another meter to be visually recognized as a single meter unit.

In view of the above circumstance, this invention has been accomplished.

SUMMARY OF THE INVENTION

An object of this invention is to provide a display device for a motor vehicle which can realize a display with a sense of unity between a real image and a virtual image while avoiding an increase of a dashboard in size and complication thereof in structure.

In order to attain the above object, in accordance with this invention, there is provided a display device for a motor vehicle comprising:

a first light-emitting display source for providing a first displayed image, arranged internally in the motor vehicle;

a combiner for reflecting image light of the first displayed image toward an eye point of a driver of the motor vehicle, a virtual image of the first displayed image which can be visually recognized from the eye point being displayed on the combiner; and a meter unit for displaying a status of the vehicle as a real image, the meter unit being located between the combiner and the eye point at a position outside an optical path of the image light of the first displayed image, wherein the combiner has a contour which can be visually recognized from the eye point and nearly surrounds the virtual image and the real image of the meter unit.

In accordance with this configuration, since the contour of the combiner is visually recognized to nearly surround a virtual image of the first displayed image which can be visually recognized from the eye point and a real image of the meter unit being located between the combiner and the eye point at a position outside an optical path of the image light of the first displayed image, the virtual image of the first displayed image and the real image of the meter unit can be visually recognized as combination display by a single meter unit.

Since the meter arranged at a position nearer than the combiner to the eye point is visually recognized directly as a real image from the eye point, as long as the image light of the first displayed image from the first light-emitting display source has the quantity of light approximately equal to the case of a head-up display, there is no necessity of providing a hood for intercepting external light to assure contrast of the first displayed image of the meter as in the case where the light-emitting displayed image of the meter is visually recognized as a real image through the combiner.

In a preferred embodiment of this invention, a plurality of meter units are provided apart from one another in a vehicle width direction, and a portion of the combiner which is located between the adjacent meter units reflects the image light of the first displayed image toward the eye point.

In accordance with such a configuration, since a portion of the combiner which is located between the adjacent meter units reflects the image light of the fist displayed image toward the eye point, the virtual image of the displayed image on the combiner and the real image of the meter which are visually recognized from the eye point are arranged side by side in the vehicle width direction.

In a preferred embodiment of this invention, a steering wheel is arranged at a position nearer than the combiner to the eye point, and the combiner has an upper edge in a positive arc whose curvature differs according to a parallax corresponding to a location difference between the combiner and the steering wheel from the eye point.

In accordance with such a configuration, the contour of the combiner is hidden by the steering wheel so that it cannot be visually recognized from the eye point.

In a preferred embodiment of this embodiment, the combiner is made of a material capable of transmitting light, a second light-emitting display source for providing a second displayed image representative of another status of the vehicle is arranged in front of the combiner in a longitudinal direction of the vehicle at a position opposite to the eye point with respect to the combiner, the second light-emitting display source providing the second displayed image so that its image light passes a prescribed region of the combiner and reaches the eye point without being intercepted by the meter unit, and the combiner is located to reflect the image light of the second displayed image toward the eye point in a region exclusive of the prescribed region of the combiner.

In accordance with such a configuration, a second displayed image displayed on the second light-emitting display source arranged in front of the combiner in a longitudinal direction of the vehicle at a position opposite to the eye point with respect to the combiner is visually recognized through a prescribed region, and a virtual image of the displayed image is visually recognized in a region exclusive of the prescribed region of the combiner in which the field of view is not intercepted by the meter.

In a preferred embodiment of this invention, the image displayed by the first light-emitting display source is displayed using one of P-polarized light and S-polarized light, the combiner is provided with a first polarizing plate for intercepting the light component, and a second polarizing plate for intercepting the remaining polarized light is provided between the first light-emitting display source and the combiner.

In accordance with such a configuration, the first image displayed by the first light-emitting display source is displayed using one of P-polarized light and S-polarized light. Since the remaining polarized light is intercepted by the second polarizing plate arranged between the light-emitting display source and the combiner, the image light of the first displayed image which travels from the first light-emitting source passes the second polarizing plate without being intercepted. The image light reaches the inner face subjected to half mirror processing of the combiner and is reflected toward the eye point.

Where the incident external light passes, the inside of the combiner prior to passing the second polarizing plate, either the P-polarized light or S-polarized light is intercepted by the first polarizing plate and only the remaining polarized light is emitted from the combiner. The emitted light reaches the second polarizing plate arranged between the combiner and the light-emitting display source.

Since the remaining polarized light is intercepted by the second polarizing plate, where the external light through the front glass passes the inside of the combiner, it is entirely intercepted before it reaches the light-emitting display source.

In a preferred embodiment of this invention, the second polarizing plate has a surface facing the combiner which is subjected to reflection inhibiting processing whereby reflection of light applied to the surface toward the combiner is inhibited.

In accordance with such a configuration, when the remaining polarized light of the incident external light passed the first polarizing plate reaches the second polarizing plate, although it has lower reflectance than that of the one polarized light, it is reflected toward the combiner. At least a part of the reflected light is reflected toward the eye point by the combiner.

However, since the reflection of the light reached the second polarizing plate toward the combiner is suppressed by the reflection suppressing processing applied to the surface of the second polarizing plate, the quantity of light reflected toward the eye point is reduced.

The above and other objects and features of this invention will be more apparent from the following description taken in conjunction with the accompanying drawings.

DESCRIPTION OF THE PREFERRED EMBODIMENTS

Now referring to the drawings, an explanation will be given of embodiments of a display device for a motor vehicle according to this invention.

Figure 1:
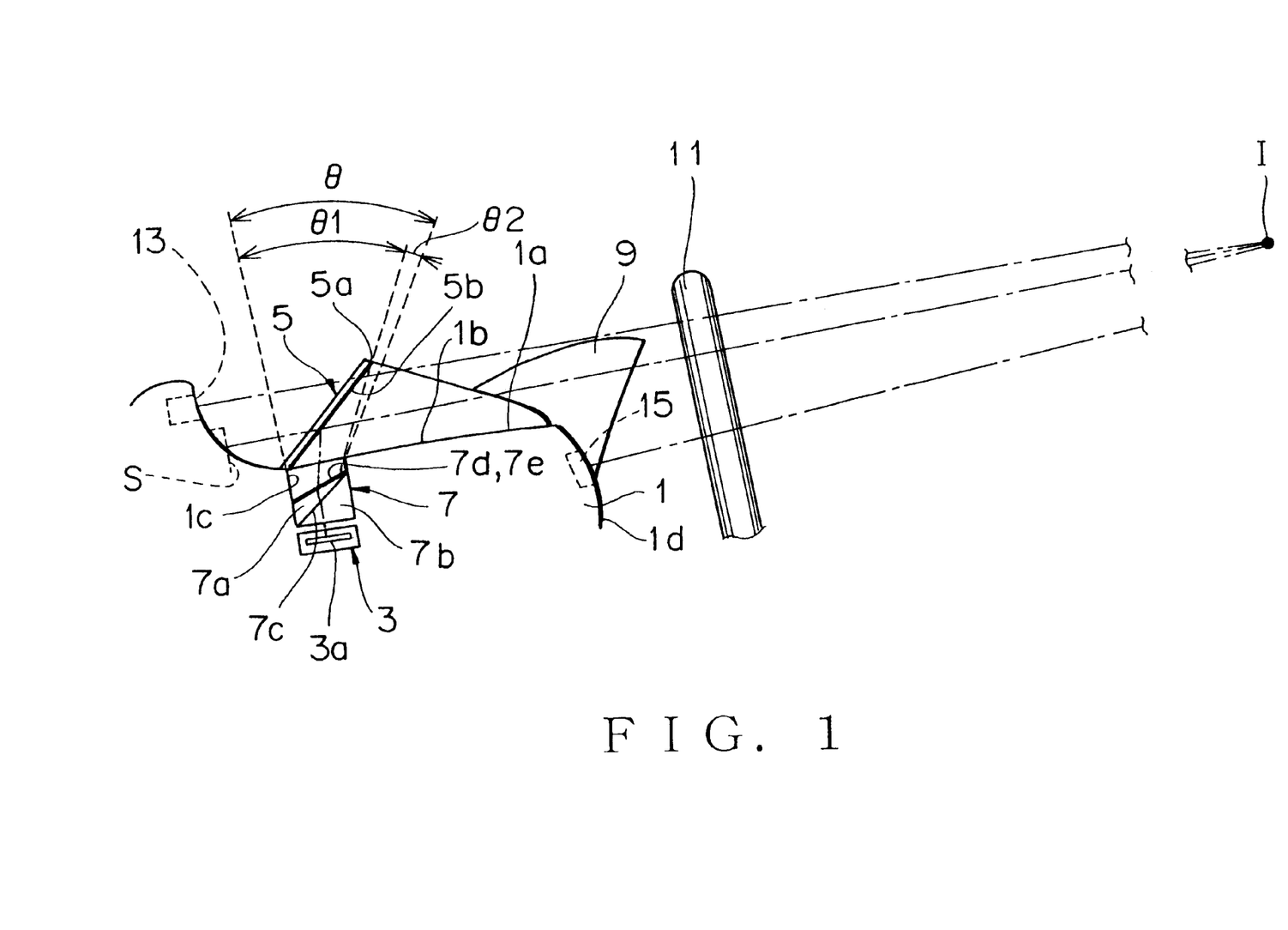
FIG. 1 is a sectional view showing a conceptual and schematic configuration of a display device for a motor vehicle according to an embodiment of this invention.

FIG. 1 is a sectional view showing a schematic diagram of a display device for a motor vehicle according to an embodiment of this invention. As seen from FIG. 1, the display device includes a indicator 3 accommodated in a dashboard of the vehicle, a combiner 5 arranged on the dashboard 1 to reflect light of a displayed image from the indicator toward the eye point of the driver, an optical path changing means 7 arranged between the indicator 3 and combiner 5 within the dashboard 1 and an analog meter unit 9 arranged nearer than the combiner 5 to the eye point I on the dashboard 1.

The dashboard 1 is colored in a dark color to prevent reflection on a front glass (not shown).

Figure 2:
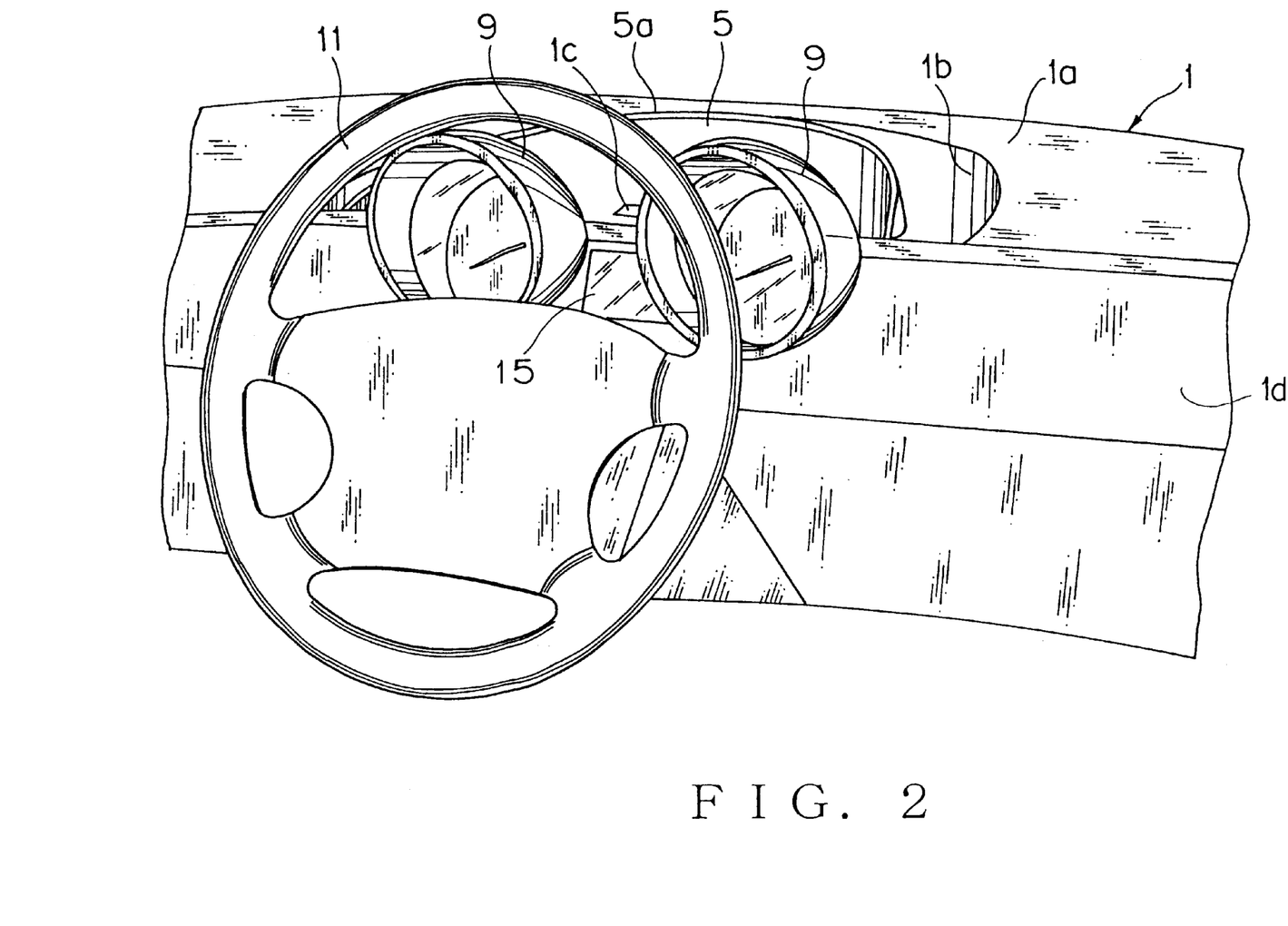
FIG. 2 is an enlarged perspective view of the display device for a vehicle shown in FIG. 1.

As seen from an enlarged perspective view of the display device for a motor vehicle shown in FIG. 2, two analog meter units 9 (corresponding to meters) are provided at the tip on the side of the eye point I of the dashboard 1, which are apart from each other in the width direction of the vehicle. A semicircular concave portion 1b is formed on the upper face 1a of the dashboard 1 so as to surround these two analog meter units 9, 9.

An opening 1c for passing the image light from the indicator 3 within the dashboard 1 is made at a position between these analog meter units 9, 9 in the width direction of the vehicle and in front of these analog meter units 9, 9 in the longitudinal direction of the vehicle.

In this embodiment, the indicator 3 (corresponding to the light emitting source) is constructed of a liquid crystal display to form a displaying face oriented upward of the vehicle using a polarizing plate 3a in the vehicle width direction.

On the indicator 3, an inverted displayed image in which the image of auxiliary information necessary for driving (e.g. moving direction and running speed on a navigation device) is displayed by the liquid crystal cells sealed therein. In this case, the upper side of the normal image is located on the rear side of the vehicle while the lower side thereof is located on the front side of the vehicle. The image light of the inverted displayed image polarized in the vehicle width direction is emitted from the polarizing plate 3a.

The image light of the inverted image displayed on the indicator 3 passes through the optical path changing means 7 and through the opening 1c of the dashboard 1. Further, the image light is projected onto the combiner 5 on the dashboard 1. Thus, the virtual image of the normal image formed by turning over and upside down the inverted image displayed on the indicator 3 is visually recognized from the eye point I.

The combiner 5 is formed by making a band-like plate using dark-colored resin subjected to smoke processing, i.e. semitransparent member so as to become gradually smaller in width in the longitudinal direction and bending the plate in an positive arc. As seen from FIG. 2, the combiner 5 is located so as to be concentric with the inner periphery of the concave portion of the dashboard 1 and to be concave on the side of the eye point I since both ends in the longitudinal direction are located behind and the center is located forward. The combiner 5 is inclined so that its upper side is located behind and the lower side is located forward and protruded from the concave portion 1b.

The combiner 5 is formed with a length in a longitudinal direction so that it can surround the opening 1c from forward to both sides in the width direction and locate the two analog meter units 9, 9 in its inside so that it is located on the optical path of the external light which is incident from the outside of the vehicle, passes through the opening 1c of the dashboard 1 and travels toward the indicator 3.

The combiner 5 is formed with a width so that it is located within an angle θ1 indicated in FIG. 1 of the entire angle θ of the above external light.

The combiner 5 thus formed is located so that its center portion in the longitudinal direction is located immediately before the opening 1c of the dashboard 1 in the longitudinal direction of the vehicle.

Figure 3:
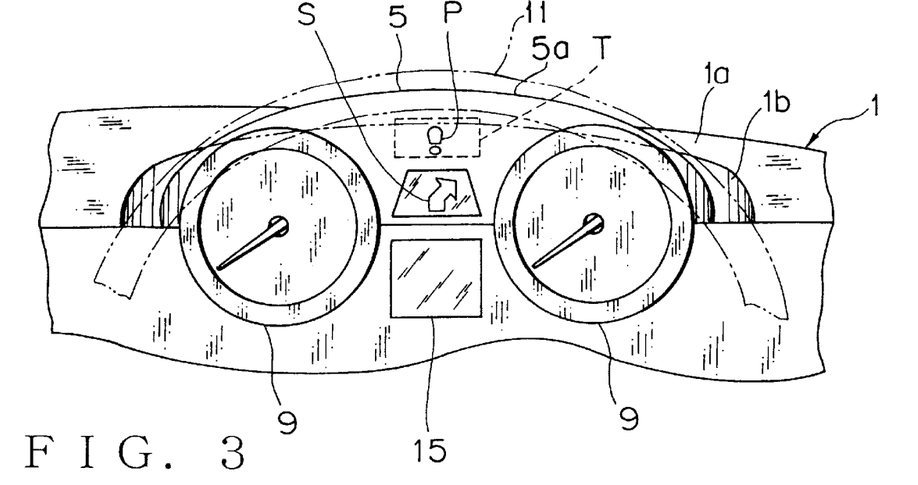
FIG. 3 is a front view of the display device for a motor vehicle shown in FIG. 1.

As seen from an enlarged front view of the display device in FIG. 3, the combiner 5 is formed in an external contour of positive arc so that the center portion of the upper edge 5a of the combiner overlaps the steering wheel 11 arranged before the combiner 5 and hence it does not extend out on the forward field of view visually recognized from the eye point I through the steering wheel 1.

As seen from FIG. 1, the inner face located on the side of the eye point I of the combiner 5 is coated with a polarizing plate 5b (corresponding to the first polarizing plate) which has a polarizing direction of a vehicle height different by 90° from the polarizing plate 3a of the indicator 3. The polarization by this polarizing plate 5b and the smoking processing made for the combiner 5 itself serve to reduce the light passing through the combiner 5.

In the combiner 5 having such a configuration, the region which the virtual image S of the normal image is visually recognized when the image light of the inverted displayed image from the indicator 3 is projected is the region in the vicinity of the center in the vehicle direction, or in the longitudinal direction of the combiner 5 which is directly visually recognized from the eye point I through between the two analog meter units 9, 9.

As described above, the combiner 5 has a positive arc shape in the vehicle width direction and is inclined in the vehicle height direction so that the upper edge 5a is nearer than the lower edge to the eye point I. Therefore, the length of the optical path of the inverted displayed image from the indicator 3 to the eye point I via the combiner 5 is shorter on the side of the upper edge of the combiner 5 than on the side of the lower edge thereof. The length of the optical path is shorter on the side of both sides of the combiner than on the side of the center thereof in the vehicle width.

Figure 4:
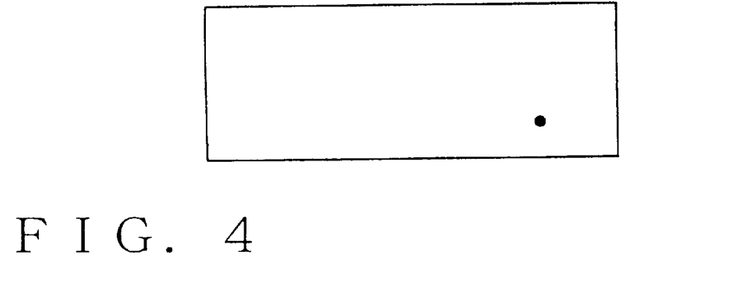
FIG. 4 is a view for explaining an example of an inverted image displayed on the indicator shown in FIG. 1.

Therefore, for example, as seen from FIG. 4, when a rectangular inverted display image in the vehicle width direction is displayed on the indicator 3 and the image light does not pass the optical path changing means 7 but is directly projected onto the area in the vicinity of the center of the longitudinal direction of the combiner 5 which is directly visually recognized from the eye point I through between the two analog meter units 9, 9, the virtual image of the normal image has a shape distorted like a fan which is narrower on the side of the upper edge 5a of the combiner 5 than on the side of the lower edge in width and warps downward on the side of both ends of the combiner 5 in the vehicle width direction.

Incidentally, since the combiner 5 warps in a positive arc in the vehicle width direction, when the inverted displayed image is reflected from the combiner 5, the normal image after reflection is extended more greatly than the inverted displayed image before reflection.

Figure 7:
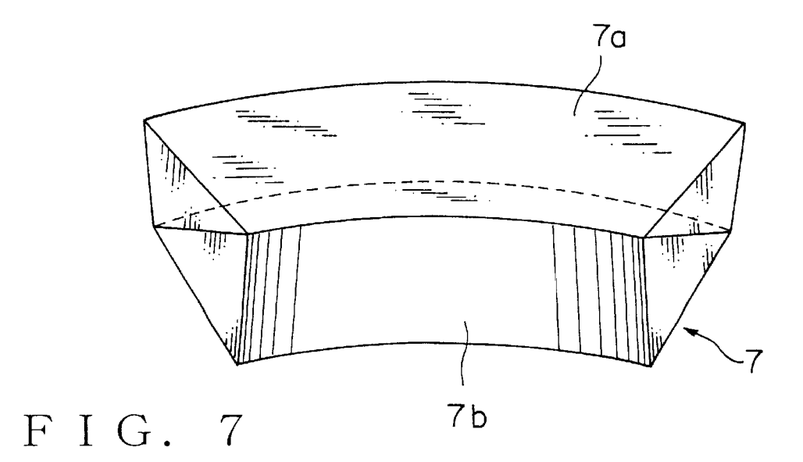
FIG. 7 is a perspective view of the optical path changing means shown in FIG. 1.

The optical path changing means 7 is a rectangular parallelepiped having a trapezoid in section composed of two prisms 7a and 7b having triangular end faces and different refraction indexes, whose slopes are bonded to each other to form an internal interface 7c. The optical path changing means 7 is formed by warping the parallelepiped in a fan when viewed in plan as seen from FIG. 7 which is a perspective view.

The optical path changing means 7 is arranged so that the curve on the short diameter side of the optical path changing means, which is constituted by the one side of the prism 7a is oriented toward the rear of the vehicle, the curve on the long diameter side thereof is oriented toward the front of the vehicle and the remaining two sides are oriented toward the opening 1c of the dashboard 1 and the polarizing plate 3a which constitutes the displaying face of the indicator 3 as seen from FIG. 1.

Figure 6:
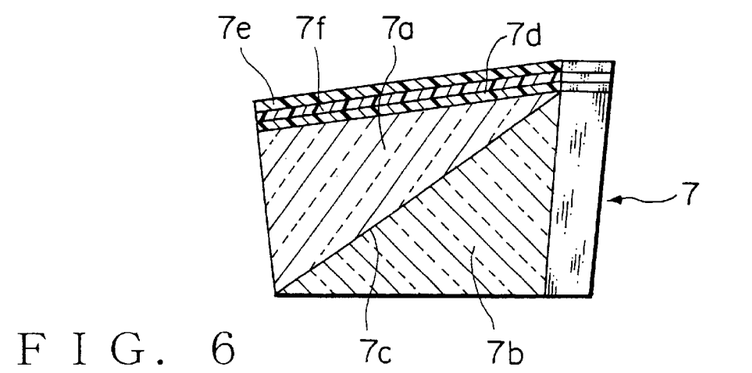
FIG. 6 is a sectional view of the optical path changing means shown in FIG. 1.

In the display device for a vehicle according to this embodiment, the one side of the optical changing means 7 oriented to the opening 1c of the dashboard 1 is coated with a polarizing plate 7d (second polarizing plate) having a polarizing direction of the vehicle width direction which coincides with that of the polarizing plate 3a of the indicator 3 as shown in FIG. 6.

Therefore, for example, when a rectangular inverted display image as seen from FIG. 4 is displayed on the indicator 3 and the image light thereof is incident on the optical path changing means 7 from the side opposite to the indicator 3, the image light emitted from the other side of the optical path changing means 7 opposite to the opening 1c of the dashboard 1 has a shape distorted like a fan which has a smaller width on the rear side than on the front side in the longitudinal direction of the vehicle and warps downward on the side of both ends of the combiner 5 in the vehicle width direction.

Since the optical path changing means 7 is arranged between the indicator 3 and the combiner 5 within the dashboard 1, when the inverted image of the auxiliary information is displayed on the indicator 3, the image light is incident on the optical path changing means 7 from the side opposite to the indicator 3, passes through the optical path changing means 7 and is emitted from the other side of the optical path changing means 7 opposite to the opening 1c of the dashboard 1. The image light is projected in the vicinity of the center of the combiner 5 which can be directly visually recognized from the eye point I through between the analog meter units 9, 9.

Figure 8:
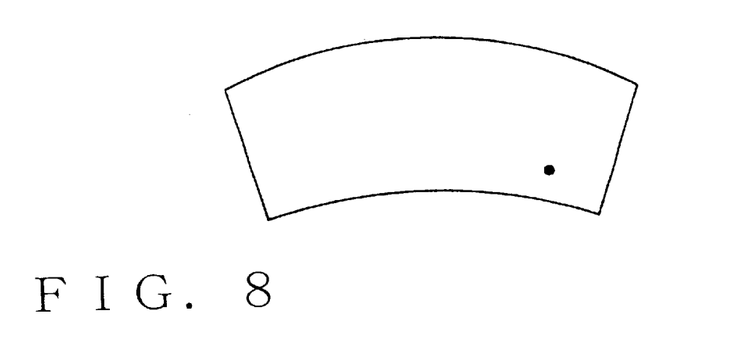
FIG. 8 is a view for explaining the distorting operation which is exerted on the image by the optical path changing means shown in FIG. 1.

Until this step, the inverted image displayed on the indicator 3 is polarized in the vehicle width direction when it passes through the polarizing plate 3a, is subjected to the distortion operation of changing the shape of the image from the rectangular shape (FIG. 4) into the fan shape (FIG. 8) by the optical changing means 7, and further passes through the polarizing plate 7d which is applied on the one side of the optical path changing means 7d opposite to the opening 1c and has a polarizing direction which coincides with that of the polarizing plate 3a.

The inverted image which has been polarized by the polarizing plate 3a and projected in the vicinity of the center of the combiner 5 cannot pass through the polarizing plate 5b which is applied on the inner face of the combiner 5 and a different light deflection direction from that of the polarizing plate 3a. The inverted image is entirely polarized by the inner face of the combiner 5 toward the eye point I.

Figure 5:
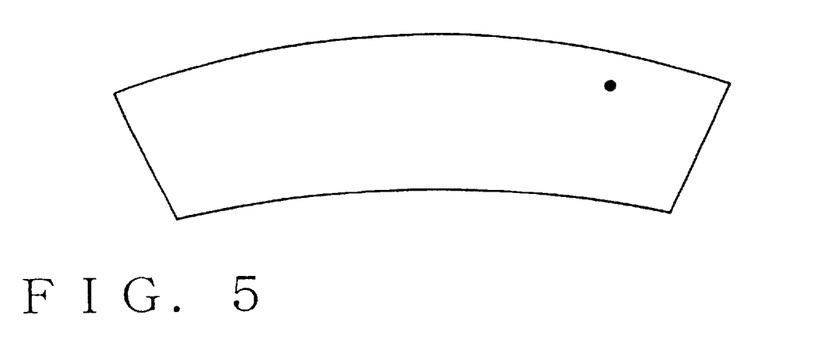
FIG. 5 is a view for explaining the distorting operation which is exerted on the image by the combiner shown in FIG. 1.

The above inverted image is converted into the normal image turned over and upside down therefrom and further subjected the distorting operation of changing the shape of the image from the rectangular shape (FIG. 4) into the fan shape (FIG. 5) by the combiner 5.

Figure 9:
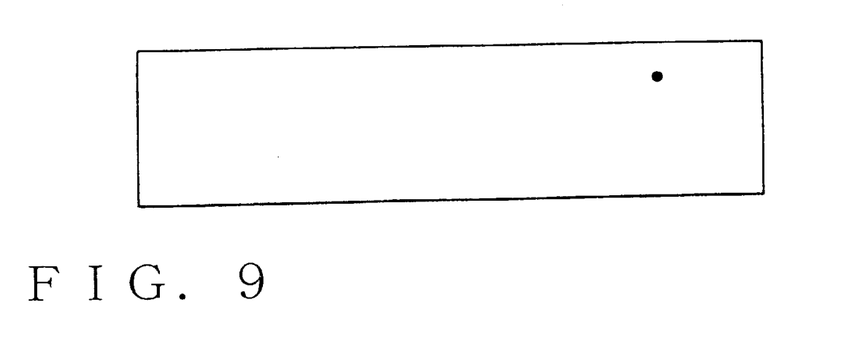
FIG. 9 is a view for explaining an normal image which is visually recognized from an eye point as a result of cancellation of the distorting operation by the optical path changing means and the combiner.

Thus, the component of the distorting operation in the longitudinal direction of the vehicle by the optical path changing means 7 is cancelled by that of the distorting operation in the vehicle height direction by the combiner 5. Therefore, as shown in FIG. 9, the normal displayed image has a shaped extended only in the vehicle height direction for the inverted displayed image.

The inverted image displayed on the indicator 3 is visually recognized as a virtual image S having a shape extended only in the vehicle width direction in the vicinity of the above center of the combiner 5.

The function of the optical path changing means for the incident light from the indicator 3 has been explained above. Meanwhile, the optical path changing means 7 has the following function for the incident light from the opening 1c of the dashboard 1.

First, in FIG. 1, the external light which passes the opening of the dashboard 1 and travels toward the optical path changing means 7 or the indicator 3 is composed of the external light component over the angle θ1 which passes the combiner 5 and that over the angle θ2 which does not pass the combiner 5.

The external light component over the angle θ1 is refracted owing to a difference between the prisms 7a, 7b and air in their refractive indexes to reach the polarizing plate 3a of the indicator 3.

On the other hand, the external light component over the angle θ2 passes the interior of the prism 7a, which is located on the side of the opening 1c to reach the interface 7c at the angle exceeding a critical angle, and internally reflected toward the one face of the prism 7a which constitutes the flat side of the optical path changing means 7 so that it does not reach the prism 7b or the polarizing plate 3a of the indicator 3.

The external light component over the angle θ1 is polarized in the vehicle height direction 5b when it passes the combiner 5b and passes the opening 1c of the dashboard 1 to reach the polarizing plate 7d of the optical path changing means 7. However, since the polarizing plate 7d has a polarizing direction of the vehicle height which is different from that of the polarizing plate 5b, the external light component which has reached the optical path changing means 7 cannot pass the polarizing plate 7d but is interrupted so that it travels to the indicator 3.

On the other hand, the external light component over the angle θ is not polarized but reaches the polarizing plate 7d. Therefore, it is polarized in the vehicle width direction by the polarizing plate and thereafter incident on the prism 7a of the optical path changing means 7. However, it reaches the interface 7c at the angle exceeding a critical angle of the prism 7a so that it is internally reflected from the interface 7c and does not travel toward the prism 7b or indicator 3.

Thus, it is possible to prevent the external light from the outside of the vehicle from being applied to the indicator 3 and from washing out the inverted image displayed on the indicator 3.

Since the combiner 5 itself is formed of the dark colored resin subjected to smoking processing, the passed light is attenuated by the combiner 5 itself. This also contributes to prevent the external light from being applied to the indicator 3.

Further, since the combiner 5 is provided upright from the concave portion 1b so that it is substantially concentric with the internal face of the concave portion 1b of the dashboard 1. The internal face of the concave portion 1b is arranged behind the combiner 5 visually recognized from the eye point I and serves to cause the combiner 5 to be recognized in the same dark color as the dashboard 1. As a result, the difference in contrast between the displayed image on the inner face of the combiner 5 visually recognized from the eye point I and its background is not attenuated by projection of the external light from the background of the combiner 5. Accordingly, the visibility of the virtual image S of the normal image can be prevented from being attenuated.

Thus, in the display device for a vehicle according to this embodiment, the "wash-out" on the indicator 3 and that on the combiner 5 can be prevented.

In the display device according to this embodiment, as processing for suppressing the reflection of the light applied to the optical path changing means 7 through the opening 1c of the dashboard 1 toward the combiner 5, the polarizing plate 7d is doubly coated with an anti-reflection (AR) film 7e and an antiglare (AG) film 7f.

Thus, when the external light polarized in the vehicle height direction permeates the AR film 7e, it is attenuated to prevent from being reflected toward the combiner 5. Therefore, the above external light does not reach the internal face of the combiner 5 and not reflected toward the eye point I.

Further, even when the external light reached the AG film 7f through the AR film 7e is reflected toward the AR film 7e, it is diffused during its reflection. Therefore, the reflected light is not concentrated to a specific region of the combiner 5 nor reflected toward the eye point I with a high quantity of light.

An indicator 15 for waning is arranged in the front surface of the dashboard 1d and its display surface is exposed to the front surface 1d. The indicator serves to display several kinds of warning information. The indicator may be e.g. a liquid crystal display (LCD), a cold cathode tube display, field emission display, fluorescent display tube, electroluminescence display, etc.

A warning display unit 13 (corresponding to the second light emitting source) is provided on the inner wall of the concave portion 1b which is located more forward of the vehicle than the opening 1c. The warning display unit 13 serves to make conventional display of symbol marks for warning.

When the warning display unit 13 performs light-emitting display, a light-emitted display image P (real image) of various kinds of warning information, which has passed the combiner 5, is visually recognized at a region T which is more upper in the vehicle height direction than the region where the virtual image of the normal image is displayed on the indicator 3. As shown in FIG. 3, the region T is in the vicinity of the center of the combiner 5 in the longitudinal direction thereof which is directly visually recognized from the eye point I through between the two analog meter units 9, 9.

The real image of the indicator 15 for warning is visually recognized beneath the combiner 5 from the eye point I.

In both cases where the display unit 14 for warning performs light-emitting display and the indicator 3 performs light-emitting display, all of the light-emitting displayed image P of various kinds of warning information, virtual image of the normal image by the indicator 3, two analog meter units 9, 9 and indicator 15 for warning are visually recognized through the steering wheel 3 from the eye point I so that they are located inside the steering wheel 11.

In this embodiment, as shown in FIG. 2, the indicator 3 as well as the combiner 5 and the optical path changing means 7 is postured entirely to fall forward so that its front is at a low level and the rear is at a high level. Therefore, for any of the polarizing plate 3a which constitutes the displaying plane of the indicator 3 and the polarizing plates 5b and 7d applied on the combiner 5 and optical path changing means 7, the linear polarized light component which vibrates in the vehicle width direction constitutes an S-polarized light component and the linear polarized light component which vibrates in the vehicle height direction constitutes a P-polarized light component.

The combiner 5 is located on the optical path over the entire range in the vehicle width of the external light such as incident sunlight which travels toward the indicator 3 through the opening 1c of the dashboard 1.

An explanation will be given of the operation of the display device for a vehicle, constructed as explained hitherto.

In the display device for a vehicle according to this embodiment, the region for visually recognizing the virtual image S of the normal image of the combiner 5 and a prescribed region T where the real image P of the light emitting displayed image by the display unit 13 for warning are arranged between two analog meter units 9, 9 on the field of view from the eye point I. In this state, the upper edge 5a of the combiner 5 almost surrounds these two analog meter units 9, 9, indicator 15 for warning, real image of the light-emitting displayed image P and virtual image S of the normal image. Therefore, the components inclusive of the analogmeter units 9, 9, display unit 13 for warning, indicator 15 for warning and combiner 5, which are individually provided, are visually recognized as if they were a single combination meter unit, thereby creating sense of unity.

In addition, the combiner 5 is provided upright from the concave portion 1b of the upper side 1a of the dashboard 1. Therefore, by constructing the combiner 5 at a height corresponding to the depth of the concave portion 1b, the combiner 5 which may not be transparent can be located so that the forward field of view from the eye point I is not intercepted.

The upper edge 5a of the combiner 5 can be made to overlap the steering wheel 11 in the field of view from the eye point I so that the upper edge 5a is not visually recognized. Therefore, apart from the visual effect like the single combination meter unit, by making the edge 5a of the combiner 5 invisible, occurrence of a sense of incongruity can be prevented.

As described above, in the display device for a vehicle according to this embodiment, the region for visually recognizing the virtual image S of the normal image of the combiner 5 and a prescribed region T where the real image P of the light emitting displayed image by the display unit 13 for warning are arranged between two analog meter units 9, 9 on the field of view from the eye point I. For this reason, as compared with the case where the region for visually recognizing the virtual image S of the normal image of the combiner 5 is arranged above or below the analog meter unit 9, 9 necessity of increasing the depth of the concave portion 1b of the dashboard and increasing the size of the combiner 5 in the vehicle height direction can be removed so that the combiner 5 can be located outside the forward field of view of the vehicle while the forward field of view of the vehicle in the vehicle height direction is widely assured.

In the display device for a vehicle according to this embodiment, in order that the light-emitting displayed image P by the display unit 13 for warning can be visually recognized through the combiner 5 from the eye point I, the combiner 5 is formed of the dark-colored transparent resin subjected to the smoking processing. Therefore, the inner face of the combiner 5 on the side of the eye point I is coated with the polarizing plate 5b having the polarizing direction of the vehicle height direction, and further, the one side of the optical path changing means 7 oriented toward the opening 1c of the dashboard 1 is coated with the polarizing plate 7d having the polarizing direction of the vehicle width direction which is the same as that of the polarizing plate 3a of the indicator 3.

Thus, the polarizing plate 7d permits the image light of the inverted image from the indicator 3 to reach the inner face of the combiner 5 and to be reflected toward the eye point I. In addition, the polarizing plate 7d prevents the external light which has passed the polarizing plate 5b from reaching the polarizing plate 3a of the indicator 3 so that the indicator 3 is not heated by the radiation of the external light.

In the display device for a vehicle according to this embodiment, the AR film 7e applied to the polarizing plate 7d prevents the external light which has passed the polarizing plate 5b from being reflected toward the inner face of combiner 5 and reflected toward the eye point I.

Further, the AG film 7f located between the AR film 7e and the polarizing plate 7d diffuses and reflect the external light which has passed the AR film 7e so that the reflected light is not concentrated to the prescribed region in the inner face of the combiner 5. Thus, the quantity of external light reflected by the inner face of the combiner 5 is not increased, thereby providing the glare protection effect.

In accordance with this invention, by providing the combiner 5 upright from the concave portion 1b of the dashboard 1 at a height corresponding to its depth, the combiner 5 can be constructed so that the forward field of view outside the vehicle from the eye point I. Therefore, this invention can be applied to a display device for a vehicle using a transparent combiner not subjected to smoking processing and light attenuation processing by coating of the polarizing plate.

Either one of the AR film 7e and AG film 7f may be omitted. Irrespectively of this, the one side of the optical path changing means 7 is may be subjected to water repellent processing in order to prevent the reflection effect from being increased owing to the application of oil such as a finger mark.

The indicator 15 for warning which can be directly visually recognized from the eye point I may be omitted. A single or three or more analog meter units 9 may be provided.

The entire combiner 5 may not be warped in a positive arc shape in the vehicle width direction. The distortion function of the image by the optical path changing means 7 may be modified or omitted in view of the shape of the region of the combiner 5 onto which the inverted image is projected and of the distortion generated according to the shape.

The optical path changing means 7 may be omitted. In this case, the polarizing plate 7d may be provided as a single plate unit between the indicator 3 and combiner 5. Otherwise, the polarizing plate can be applied to a transparent protection cover which can be provided to prevent dust from invading.

Further, where the real image of the light emitting image P by the display unit 13 for warning which has passed the combiner 5 is not visually recognized from the eye point I, the combiner 5 may be made of a light blocking material.

In this case, the indicator 3 is not limited to a display in which the image light of the displayed image is subjected to the polarization, such as a liquid crystal display equipped with a backlight, as described above, but may be a self-emitting device such as an FE (field emission) display, fluorescent display tube, EL (electroluminescent) display, etc.

Further, in this case, the polarizing plate 5b of the combiner 5, polarizing plate 7d of the optical path changing means 7 and AR film 7e or AG film 7f applied to the polarizing plate 7 may be omitted. Otherwise, the repellent processing for the one side of the optical path changing means 7 may be omitted.

Incidentally, the contents of Japanese Patent Appln. No. 01-164894 filed on May 31, 2001 are hereby incorporated by reference.

What is claimed is:

1. A display device for a motor vehicle comprising:

a first light-emitting display source for providing a displayed image, arranged internally in the motor vehicle;

a combiner for reflecting image light of said first displayed image toward an eye point of a driver of the vehicle, a virtual image of said first displayed image which can be visually recognized from the eye point being displayed on the combiner; and a meter unit for displaying a status of the vehicle as a real image, said meter unit being located between said combiner and said eye point at a position outside an optical path of the image light of said first displayed image, wherein said combiner has a contour which can be visually recognized from said eye point and nearly surrounds said virtual image and the real image of said meter unit.

2. A display device according to claim 1, wherein a plurality of meter units are provided apart from one another in a vehicle width direction, and a portion of said combiner which is located between the adjacent meter units reflects the image light of said first displayed image toward the eye point.

3. A display device according to claim 1, wherein a steering wheel is arranged at a position nearer than said combiner to the eye point, and said combiner has an upper edge in a positive arc whose curvature differs according to a parallax corresponding to a location difference between said combiner and said steering wheel from said eye point.

4. A display device according to claim 1, wherein said combiner is made of a material capable of transmitting light, a second light-emitting display source for providing a second displayed image representative of another status of the vehicle is arranged in front of said combiner in a longitudinal direction of the vehicle at a position opposite to said eye point with respect to said combiner, said second light-emitting display source providing said second displayed image so that its image light passes a prescribed region of said combiner and reaches said eye point without being intercepted by said meter unit, and said combiner is located to reflect the image light of said second displayed image toward said eye point in a region exclusive of said prescribed region of said combiner.

5. A display device according to claim 4, wherein the first displayed image displayed by the first light-emitting display source is displayed using one of P-polarized light and S-polarized light, said combiner is provided with a first polarizing plate for intercepting said one polarized light, and a second polarizing plate for intercepting the remaining polarized light is provided between said first light-emitting display source and said combiner.

6. A display device according to claim 5, wherein said second polarizing plate has a surface facing said combiner which is subjected to reflection inhibiting processing whereby reflection of light applied to the surface toward said combiner is inhibited.

* * * * *